United States Patent
Li et al.

(10) Patent No.: US 7,980,539 B2
(45) Date of Patent: Jul. 19, 2011

(54) FIXTURE FOR AUTOMATICALLY POSITIONING WORKPIECE

(75) Inventors: Hua Li, Shenzhen (CN); Xi-Song Shuai, Shenzhen (CN); Zhuang Xiong, Shenzhen (CN); Dong Li, Shenzhen (CN); Zhao-Meng Xia, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 432 days.

(21) Appl. No.: 12/177,113

(22) Filed: Jul. 21, 2008

(65) Prior Publication Data

US 2009/0179369 A1    Jul. 16, 2009

(30) Foreign Application Priority Data

Jan. 16, 2008   (CN) .......................... 2008 1 0300102

(51) Int. Cl.
*B25B 1/24* (2006.01)
(52) U.S. Cl. ............................. 269/266; 269/71; 269/73
(58) Field of Classification Search .................. 269/266, 269/71, 73, 216, 217, 313, 314; 29/252, 29/261
See application file for complete search history.

(56) References Cited

U.S. PATENT DOCUMENTS

| | | | | |
|---|---|---|---|---|
| 2,835,029 A * | 5/1958 | Collins, Sr. | ...................... | 29/261 |
| 2,850,926 A * | 9/1958 | Jobe | ............................... | 269/234 |
| 2,910,110 A * | 10/1959 | Frohlich | ....................... | 269/275 |
| 3,588,983 A * | 6/1971 | Hoy | ................................ | 29/764 |
| 3,758,099 A * | 9/1973 | Scott | ............................... | 269/58 |
| 4,027,867 A * | 6/1977 | Pollington | ..................... | 269/94 |
| 4,365,792 A * | 12/1982 | Johns | ............................. | 269/24 |
| 4,515,355 A * | 5/1985 | Hunter | ........................... | 269/234 |
| 4,763,886 A * | 8/1988 | Takei | .............................. | 269/73 |
| 4,901,991 A * | 2/1990 | Bonkowski | .................. | 269/234 |
| 5,090,101 A * | 2/1992 | Welty | ........................... | 29/243.5 |
| 6,350,080 B1 * | 2/2002 | Do et al. | ........................ | 403/381 |
| 6,644,089 B1 * | 11/2003 | Gorgen | .......................... | 72/452.9 |
| 2007/0040314 A1 * | 2/2007 | Woo et al. | ....................... | 269/73 |
| 2009/0179369 A1 * | 7/2009 | Li et al. | .......................... | 269/266 |

FOREIGN PATENT DOCUMENTS

JP            61103711 A        5/1986

* cited by examiner

*Primary Examiner* — George Nguyen
(74) *Attorney, Agent, or Firm* — Jeffrey T. Knapp

(57) ABSTRACT

An exemplary fixture includes a holder, a moving transfer unit, a clamping arm, and a driving unit. The moving transfer unit is located on the holder, and includes a pushing block. The pushing block has a urging element on an upper surface thereof. The clamping arm includes a pivot axis and a slanted surface. The urging element of the pushing block interacts with the slanted surface to rotate the clamping arm along the pivot axis. The driving unit is connected to the pushing block for moving the pushing block of the moving transfer unit.

15 Claims, 5 Drawing Sheets

FIXTURE FOR AUTOMATICALLY POSITIONING WORKPIECE

BACKGROUND

1. Field of the Invention

The present invention generally relates to fixtures, and particularly, to a fixture for automatically positioning a workpiece.

2. Discussion of the Related Art

In manufacturing industries, in order to enhance the mechanical strength of an electronic device, the electronic device typically employs one or more metallic covers. In addition, the metallic covers are required to be formed with many holes, such as through holes or blind holes.

Generally, the holes of a metallic workpiece (blank) for the metallic cover are formed by punching or drilling. Usually, after punching or drilling the metallic workpiece to form holes, a plurality of burrs adjacent to peripheries of the holes are produced. Therefore, the burrs should been removed to improve the appearance and safety of the cover. Before removing the burrs, the metallic workpiece should be positioned tightly by a fixture. However, if the outer surface of the metallic workpiece includes a curved portion and a planar portion, positioning the workpiece is mainly performed by manually fixing the workpiece to a fixture one at a time. Therefore, the process of positioning the workpiece consumes relatively much time.

What is needed, therefore, is a new fixture that can overcome the above-mentioned shortcomings.

SUMMARY

A fixture includes a holder, a moving transfer unit, a clamping arm, and a driving unit. The moving transfer unit is located on the holder. The moving transfer unit includes a pushing block. The pushing block has a urging element on an upper surface thereof. The clamping arm includes a pivot axis and a slanted surface. The urging element of the pushing block interacts with the slanted surface to rotate the clamping arm along the pivot axis. The driving unit is connected to the pushing block for moving the pushing block of the moving transfer unit.

Other novel features will become more apparent from the following detailed description, when taken in conjunction with the accompanying drawings.

BRIEF DESCRIPTION OF THE DRAWINGS

The components in the drawings are not necessarily to scale, the emphasis instead being placed upon clearly illustrating the principles of the present fixture. Moreover, in the drawings, like reference numerals designate corresponding parts throughout several views, and all the views are schematic.

DETAILED DESCRIPTION OF THE EMBODIMENTS

Reference will now be made to the drawings to describe exemplary embodiments of the present fixture in detail.

Figure 1:
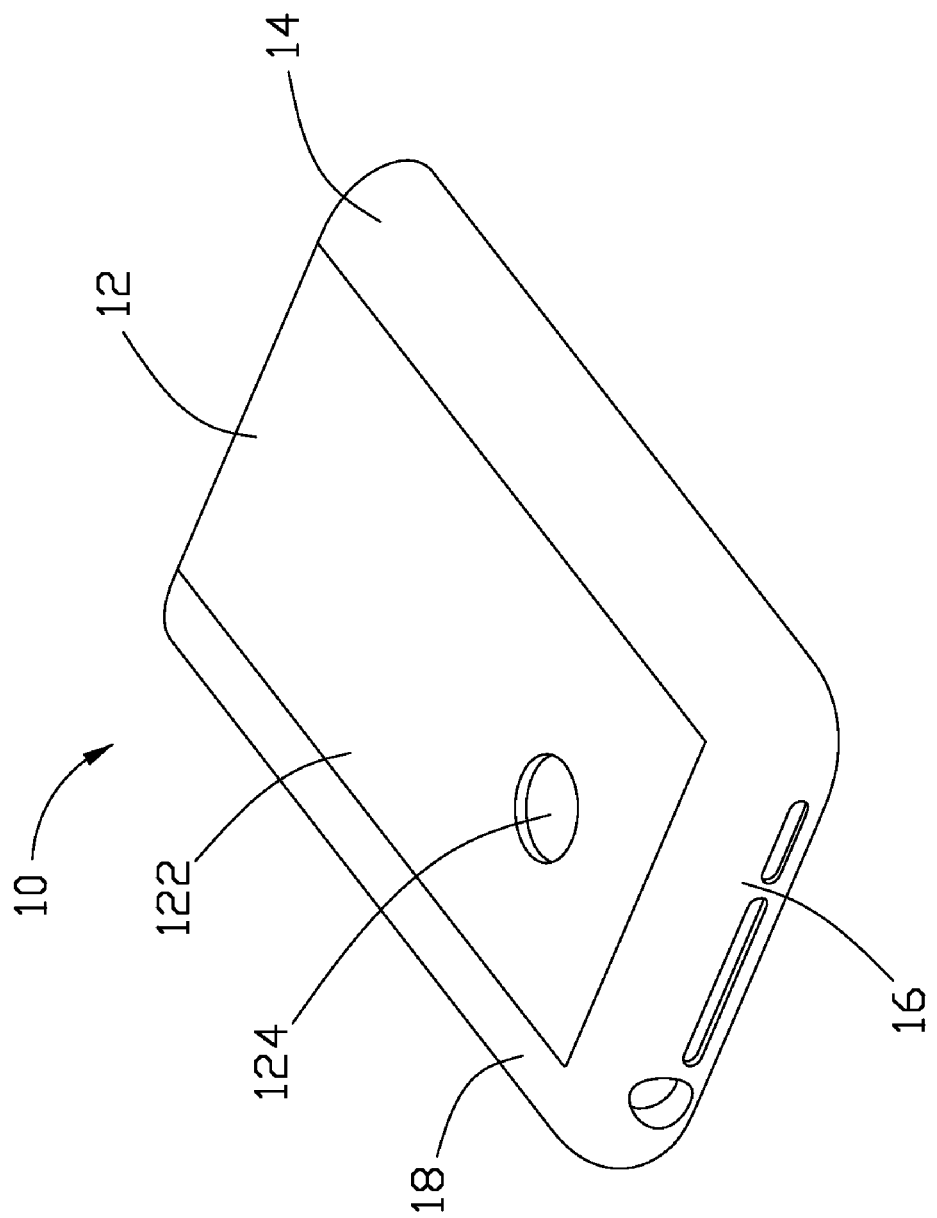
FIG. 1 is an isometric view of a workpiece that is used to make a cover of an electronic device.

Referring to FIG. 1, a metallic workpiece 10 is used to make a cover of an electronic device. The workpiece 10 includes a bottom board 12, a first sidewall 14, a second sidewall 16, and a third sidewall 18. The bottom board 12 includes a planar surface 122 and a through hole 124 defined in the planar surface 122. There are a plurality of burrs (not shown) adjacent to a periphery of the hole 124. The first side wall 14 and the third sidewall 18 extend from opposite edges of the bottom board 12 correspondingly. The second sidewall 16 extends from one of the edges of the bottom board 12 that is between the first sidewall 14 and the third sidewall 18, and further interconnects with ends of the first sidewall 14 and the third sidewall 18 correspondingly. All of the first sidewall 14, the second sidewall 16, and the third sidewall 18 are curved in shape.

Figure 2:
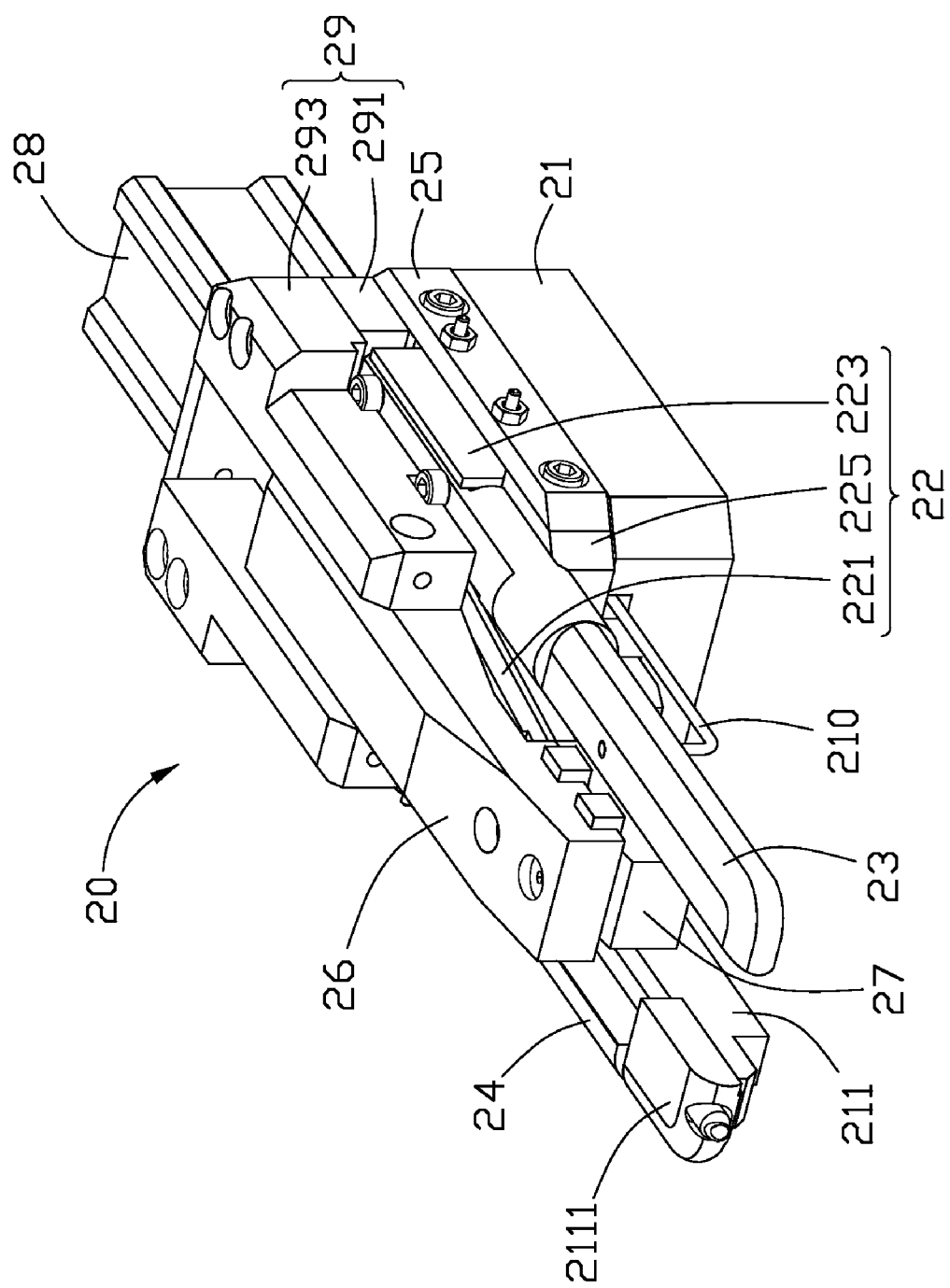
FIG. 2 is an assembled view of a fixture in accordance with an exemplary embodiment of the present invention.

Referring also to FIG. 2, a fixture 20 according to an exemplary embodiment is shown. The fixture 20 is usually mounted on a machine for positioning the workpiece 10 for an exemplary purpose, such as removing the burrs adjacent to the periphery of the hole 124 of the workpiece 10. The fixture 20 includes a holder 21, a moving transfer unit 22, a first fixing arm 23, a second fixing arm 24, two restricting members 25, a first clamping arm 26, a second clamping arm 27, a driving unit 28, and a cover 29.

Figure 3:
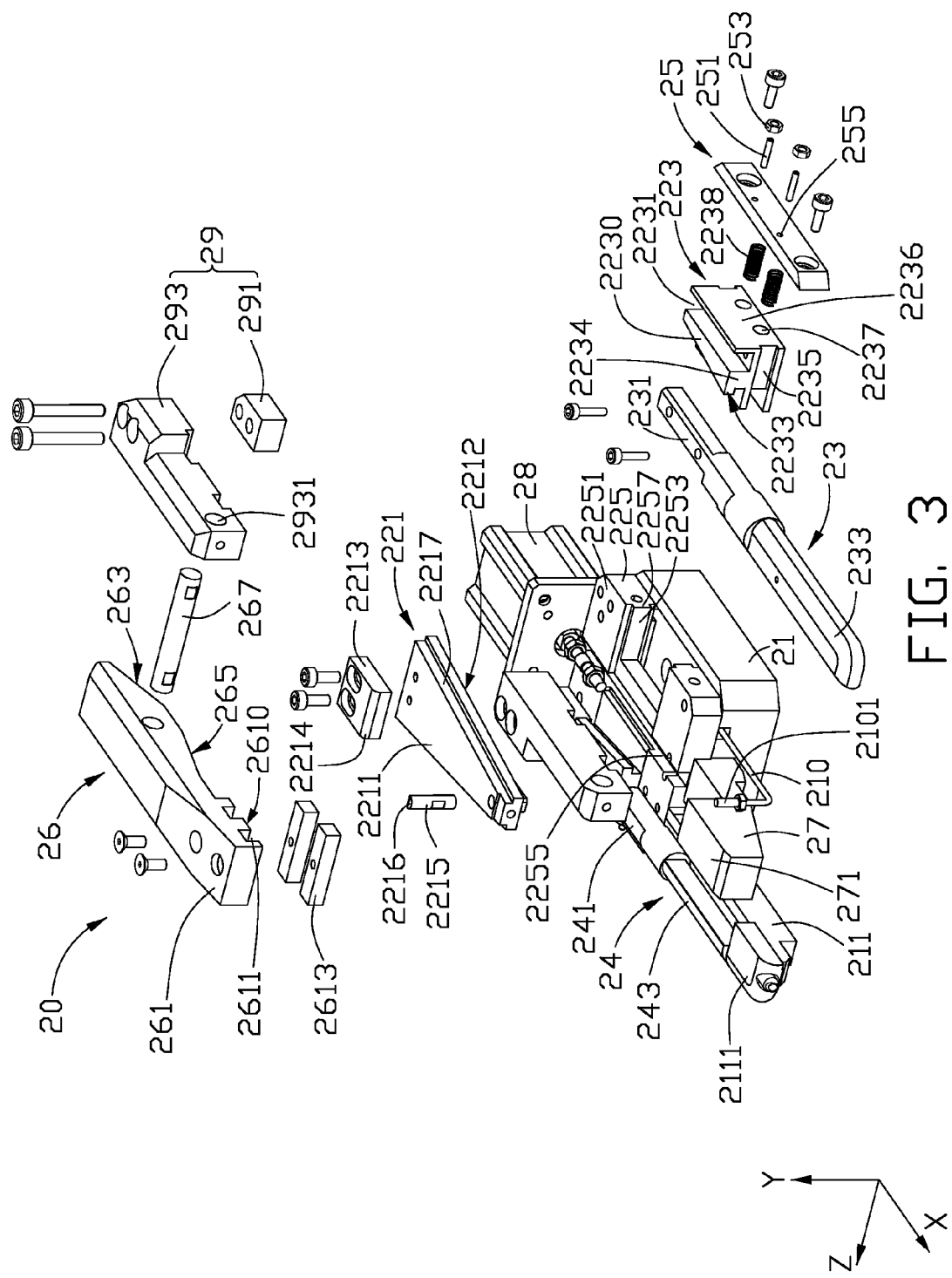
FIG. 3 is an exploded view of certain parts of the fixture of FIG. 2.

Referring also to FIG. 3, the holder 21 includes a mating arm 211 on an end thereof. The mating arm 211 has a protrusion 2111. A shape of the protrusion 2111 corresponds to inner surfaces of the second sidewall 16 and the third sidewall 18 of the workpiece 10.

The moving transfer unit 22 includes a pushing block 221, two connecting members 223, and a guiding member 225.

Figure 4:
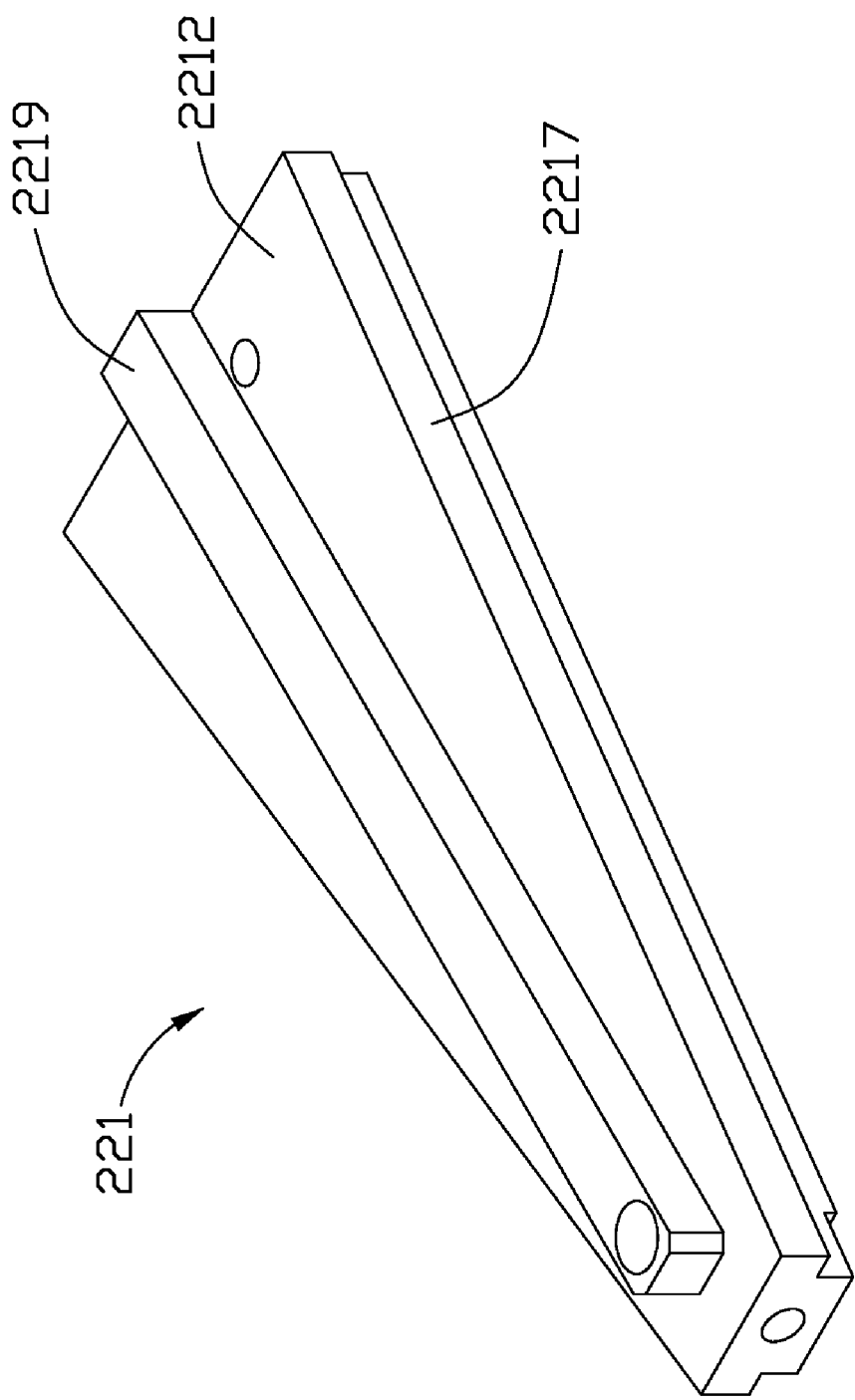
FIG. 4 is an enlarged, isometric view of a pushing block of the fixture of FIG. 2.

Referring also to FIG. 4, the pushing block 221 is connected to the driving unit 28. A shape of the pushing block 221 is symmetrical. The pushing block 221 includes an upper surface 2211, a lower surface 2212, a first urging element 2213, a second urging element 2215, two slanted side surfaces 2217, and a sliding protrusion 2219. The upper surface 2211 and the lower surface 2212 are on opposite sides of the pushing block 221. The first urging element 2213 and the second urging element 2215 are on opposite ends of the upper surface 2211. The first urging element 2213 is a block, which is fixed on the end of the upper surface 2211 adjacent to the driving unit 28 by screws (not labeled). The first urging element 2213 has a first slanted mating surface 2214. The second urging element 2215 is semicylindrical, and is inserted/fixed in a hole (not labeled) defined in the upper surface 2211. The second urging element 2215 has a second slanted mating surface 2216. The slanted side surfaces 2217 connect with the upper surface 2211 and the lower surface 2212. A width between the two slanted side surfaces 2217 decreases along a direction away from the driving unit 28. The sliding protrusion 2219 is an elongated rail located at the lower surface 2212, and extends along an axis of the pushing block 221 that is parallel to the first fixing arm 23 and the second fixing arm 24. A cross section of the sliding protrusion 2219 taken along a direction perpendicular to the axis of the pushing block 221 is rectangular.

Each of the connecting members 223 includes a top surface 2230, a mating surface 2233, two connecting side surfaces 2234, and an outer side surface 2236. The mating surface 2233 and the outer side surface 2236 are on opposite sides of the connecting members 223. The connecting side surfaces 2234 connect the mating surface 2233 and the outer side surface 2236. The top surface 2230 defines a fixing groove 2231. Each of the connecting side surfaces 2234 defines a mating groove 2235 therein. The outer side surface 2236 defines two blind holes 2237. In addition, two springs 2238 are configured in the blind holes 2237 correspondingly.

The guiding member 225 located on the holder 21 is substantially in the form of an "H" shape. The guiding member 225 is configured for guiding the pushing block 221 and the connecting members 223 to move. The guiding member 225 includes a top surface 2251, an inner side surface 2253 connecting with the top surface 2251, an elongated guiding groove 2255 defined in the top surface 2251 at a middle portion of the guiding member 225, and two guiding protrusions 2257 formed on the inner side surface 2253. A cross section of the guiding groove 2255 taken along a direction perpendicular to an axis of the guiding member 225 is rectangular, and corresponds to the shape of the sliding protrusion 2219.

When the moving transfer unit 22 is assembled, the pushing block 221 is located on the guiding member 225, and the sliding protrusion 2219 is engaged in the guiding groove 2255. The slanted side surfaces 2217 of the pushing block 221 contact the mating surfaces 2233 of the connecting members 223 correspondingly. The guiding protrusions 2257 of the guiding member 225 are engaged in the mating grooves 2235 of the connecting members 223 and slidable in the mating grooves 2235.

The first fixing arm 23 and the second fixing arm 24 are correspondingly fixed to the connecting members 223 of the moving transfer unit 22 by screws (not labeled) at two sides of the guiding member 225. The first fixing arm 23 includes a fixing portion 231 and a clamping portion 233. The second fixing arm 24 includes a fixing portion 241 and a clamping portion 243. The fixing portions 231, 241 are engaged in the fixing grooves 2231 of the connecting members 223 of the moving transfer unit 22 correspondingly. Referring to FIGS. 1 and 3 together, a shape of the clamping portion 233 of the first fixing arm 23 corresponds to the inner surfaces of the first sidewall 14 and the second sidewall 16 of the workpiece 10. A shape of the clamping portion 243 of the second fixing arm 24 corresponds to the inner surfaces of the third sidewall 18 of the workpiece 10.

Each of the restricting members 25 is substantially a planar sheet. The restricting members 25 are fixed to the guiding member 225 of the moving transfer unit 22 by screws (not labeled). The side surface of each restricting member 25 adjacent to the connecting member 223 is resisted by the springs 2238 in the blind holes 2237 of the connecting member 223. Each of the restricting members 25 includes a restricting pin 251 for restricting the movement of the connecting member 223. Each of the restricting pins 251 is fixed to the corresponding restricting member 25 by means of a nut 253 and a fixed hole 255.

The first clamping arm 26 and the second clamping arm 27 are on opposite sides of the moving transfer unit 22. The first clamping arm 26 includes a first clamping head 261, a first slanted surface 263, a second slanted surface 265, and a pivot axis 267. The first clamping head 261 is located on an end of the first clamping arm 26 far away from the driving unit 28. The clamping head 261 includes a lower surface 2610, two recesses 2611 defined in the lower surface 2610, and two soft blocks 2613 fixed in the recesses 2611 correspondingly. The soft blocks 2613 are used to contact the workpiece 10 and prevent the planar surface 122 of the workpiece 10 from being scratched and/or damaged. The first slanted surface 263 is located on an end of the first clamping arm 26 opposite to the clamping head 261. The second slanted surface 265 is located between the first clamping arm 26 and the clamping head 261. The first slanted surface 263 and the second slanted surface 265 correspond to the first mating slanted surface 2214 and the second mating slanted surface 2216 respectively. The pivot axis 267 is located between the first slanted surface 263 and the second slanted surface 265. When the first mating slanted surface 2214 or the second mating slanted surface 2216 interacts on the first slanted surface 263 or the second slanted surface 265 correspondingly, the first clamping arm 26 rotates relative to the pivot axis 267.

The second clamping arm 27 is fixed on the holder 21. The second clamping arm 27 has a second clamping head 271 corresponding to the first clamping head 261 of the first clamping arm 26. A height of the clamping head 271 is substantially equal to that of the first fixing arm 23 and the second fixing arm 24. It is understood that the clamping head 271 can be higher or lower than the first fixing arm 23 and the second fixing arm 24, according the particular configuration of the workpiece 10.

The driving unit 28 is used to move the pushing block 221. In this embodiment, the driving unit 28 is an air cylinder. In an alternative embodiment, the driving unit 28 may be a motor.

The cover 29 includes two cushioning blocks 291 and two casing boards 293 located on the guiding member 225 of the moving transfer unit 22 in that order. The cushioning blocks 291 and the casing boards 293 are fixed on the guiding member 225 by screws (not labeled). Each of the casing boards 293 defines a fixing hole 2931 in an end thereof that is far away from the driving unit 28. Two ends of the pivot axis 267 of the first clamping arm 26 are engaged in the fixing holes 2931 correspondingly.

In assembly, the moving transfer unit 22 and the second clamping arm 27 are fixed to the holder 21. The pushing block 221 of the moving transfer unit 22 is connected to the driving unit 28. The first fixing arm 23 and the second fixing arm 24 are fixed to the connecting members 223 of the moving transfer unit 22. The cover 29 is positioned on the moving transfer unit 22, and fixed with the guiding member 225 by screws (not labeled). The first clamping arm 26 is located between the casing boards 293. The pivot axis 267 of the first clamping arm 26 is engaged in the fixing holes 2931 of the casing boards 293.

Figure 5:
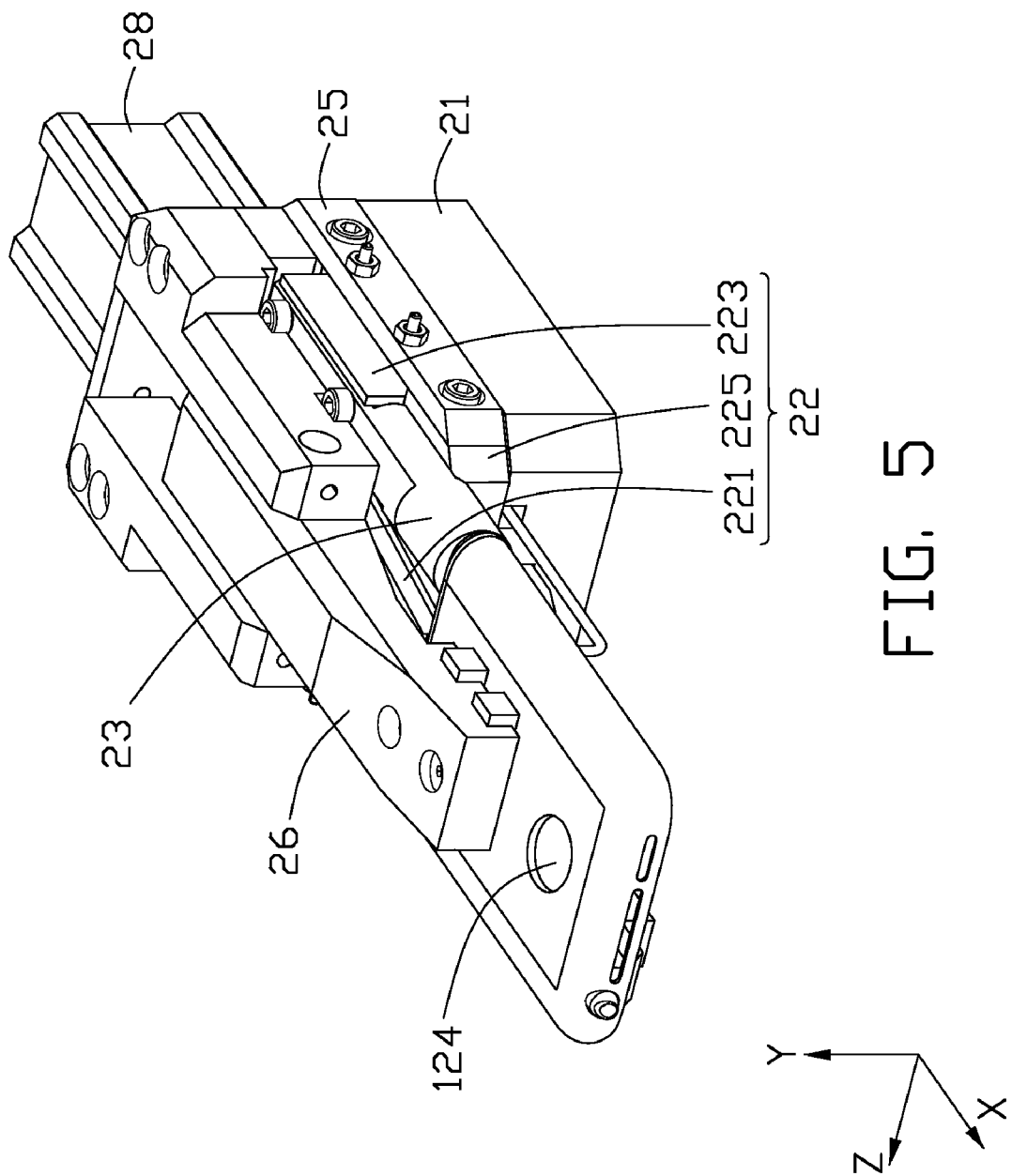
FIG. 5 is an isometric view of the fixture of FIG. 2 assembled with the workpiece of FIG. 1.

Referring to FIGS. 3 and 5, in use, the workpiece 10 is placed on the first fixing arm 23 and the second fixing arm 24; and the protrusion 2111 of the mating arm 211 mates with the inner surfaces of the second sidewall 16 and the third sidewall 18. When the driving unit 28 moves the pushing block 221 along an X-direction, the slanted side surfaces 2217 of the pushing block 221 interact with the connecting members 223, and the connecting members 223 move along a Z-direction until the connecting members 223 are restricted by the restricting members 25. The springs 2238 in the blind holes 2237 becomes compressed and accumulate elastic forces. The connecting members 223 move the first fixing arm 23 and the second fixing arm 24 so that a distance between the first fixing arm 23 and the second fixing arm 24 increases, and thus the workpiece 10 is fixed on the first fixing arm 23 and the second fixing arm 24 in the Z-direction. Simultaneously, the first urging element 2213 of the pushing block 221 interacts with the first slanted surface 263 of the first clamping arm 26, and the first clamping head 261 of the first clamping arm 26 rotates towards the workpiece 10. Therefore, the workpiece 10 is fixed by the first clamping arm 26 and the second clamping arm 27 in a Y-direction.

The workpiece 10 can then be processed. For example, the burrs adjacent to the periphery of the through hole 124 of the workpiece 10 are removed. After that, the driving unit 28 stops resisting the pushing block 221; for example, under the control of a human operator, or automatically. Thereupon, the elastic forces generated by the springs 2238 drive the connecting members 223 to return to their original positions close to each other, thereby decreasing the distance between the first fixing arm 23 and the second fixing arm 24. Therefore, in the Z-direction, the workpiece 10 is released by the first fixing arm 23 and the second fixing arm 24. Simultaneously, the pushing block 221 moves towards the driving unit 28, and the second urging element 2215 of the pushing block 221 interacts with the second slanted surface 265 of the first clamping arm 26, such that the first clamping head 261 of the first clamping arm 26 rotates away from the workpiece 10.

Therefore, in the Y-direction, the workpiece 10 is released by the first clamping arm 26 and the second clamping arm 27. In this way, the workpiece 10 is discharged (released) from the fixture 20.

In summary, the fixture 20 may automatically position and discharge (release) the workpiece 10. Thereby, a speed of the positioning process and the releasing process is improved, and the time needed to process the workpiece 10 is reduced. The workpiece 10 is controlled to be positioned and discharged only by the driving unit 28, therefore the fixture 20 is relatively compact and reliable. Furthermore, the first fixing arm 23 and the second fixing arm 24 interact with the workpiece 10 only at the inner surface of the workpiece 10, and the first clamping arm 26 has the soft blocks 2613 for contacting the workpiece 10. Thus scratching of any part of the whole outer surface of the workpiece 10 can be prevented. In addition, the pushing block 221 can be made by a grinding machine, therefore the cost of producing the pushing block 221 is relatively low.

It is noted that the scope of the present fixture is not limited to the embodiments described above. For example, to ensure the workpiece 10 is discharged from the fixture 20, the fixture 20 can further includes a detector 210. The detector 210 can be configured on the holder 21, with a detecting head 2901 of the detector 210 running through the clamping portion 233 of the first fixing arm 23. Furthermore, if the protrusion 2111 is configured on the second fixing arm 24, the mating arm 211 can be omitted. If the workpiece 10 has a relatively high structural strength, the second clamping arm 27 can be omitted. If the driving unit 28 is configured to draw back the pushing block 221, the springs 2238 in the blind holes 2237 can be omitted. If the driving unit 28 is configured to control the movement of the pushing block 221, the restricting members 25 can be omitted. If the workpiece 10 is sturdy and durable, the soft blocks 2613 can be omitted. If the workpiece 10 can be fixed by the first clamping arm 26 and the second clamping arm 27, the first fixing arm 23 and the second fixing arm 24 can be omitted, and correspondingly, the connecting members 223 can be omitted. If little detritus or dust is produced during processing of the workpiece 10, the cover 29 can be omitted. In addition, a shape of the pushing block 221 can be unsymmetrical, and one of the first fixing arm 23 and the second fixing arm 24 can be omitted. One of the first urging element 2213 and the second urging element 2215 can be omitted, and correspondingly, one of the first slanted surface 263 and the second slanted surface 265 can be omitted.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A fixture comprising:
a holder;
a moving transfer unit located on the holder, the moving transfer unit comprising a guiding member fixed on the holder and a pushing block located on the guiding member, the pushing block having a first urging element on an upper surface thereof; the guiding member configured for guiding the pushing block;
a clamping arm comprising a pivot axis and a first slanted surface, the first urging element of the pushing block configured to interact with the first slanted surface so as to rotate the clamping arm along the pivot axis; and
a driving unit connected to the pushing block for moving the pushing block of the moving transfer unit.

2. The fixture of claim 1, wherein the moving transfer unit further comprises a connecting member, the fixture further comprises a fixing arm fixed to the connecting member, and the pushing block further comprises a slanted side surface connected to the upper surface and configured to interact with the connecting member.

3. The fixture of claim 2, wherein the pushing block further comprises a lower surface and a sliding protrusion, the slanted side surface connecting with the upper surface and the lower surface, the sliding protrusion formed on the lower surface, the connecting member comprises a mating surface, and the guiding member comprises a top surface and a guiding groove defined in the top surface, the mating surface mating with the slanted side surface, and the sliding protrusion engaged in the guiding groove and slidable in the guiding groove.

4. The fixture of claim 3, wherein the connecting member further comprises a connecting side surface connecting with the mating surface, the connecting side surface defining a mating groove therein, and the guiding member further comprises an inner side surface connecting with the top surface, and a guiding protrusion formed on the inner side surface, the guiding protrusion engaged in the mating groove and slidable in the mating grooves.

5. The fixture of claim 3, further comprising a restricting member fixed to the guiding member beside the connecting member.

6. The fixture of claim 5, wherein the connecting member further comprises an outer surface, a blind hole defined in the outer surface, and a spring received in the blind hole and resisted by the restricting member.

7. The fixture of claim 6, wherein the restricting member comprises a restricting pin capable of restricting the connecting member.

8. The fixture of claim 2, wherein the holder comprises a mating arm, a shape of the mating arm corresponding to an outline of a workpiece that is fixed on the fixture.

9. The fixture of claim 2, further comprising a detector fixed to the holder.

10. The fixture of claim 9, wherein the detector comprises a detecting head passing through the fixing arm.

11. The fixture of claim 1, further comprising a cover on the moving transfer unit.

12. The fixture of claim 11, wherein the clamping arm further comprises a second slanted surface, and the pivot axis is located between the first slanted surface and the second slanted surface.

13. The fixture of claim 12, wherein the cover comprises two cushioning blocks and two casing boards located on the guiding member of the moving transfer unit in that order, each of the casing boards defines a fixing hole, and the pivot axis is engaged in the fixing holes.

14. The fixture of claim 13, wherein the pushing block further comprises a second urging element corresponding to the second slanted surface of the clamping arm.

15. The fixture of claim 1, wherein the driving unit is one of an air cylinder and a motor.

* * * * *